United States Patent
Shibatani et al.

(10) Patent No.: US 8,392,861 B2
(45) Date of Patent: Mar. 5, 2013

(54) METHOD OF SEMICONDUCTOR INTEGRATED CIRCUIT DEVICE USING LIBRARY FOR ESTIMATING TIMING/AREA TO PLACE CELLS

(75) Inventors: Satoshi Shibatani, Kanagawa (JP); Ryoji Ishikawa, Kanagawa (JP); Kenta Suto, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/046,752

(22) Filed: Mar. 13, 2011

(65) Prior Publication Data

US 2011/0239179 A1 Sep. 29, 2011

(30) Foreign Application Priority Data

Mar. 29, 2010 (JP) ................................. 2010-074219

(51) Int. Cl.
*G06F 17/50* (2006.01)
(52) U.S. Cl. ........ 716/114; 716/108; 716/118; 716/119; 716/122; 716/134; 703/19
(58) Field of Classification Search .................. 716/108, 716/113, 114, 133, 134, 135, 119–131; 703/19
See application file for complete search history.

(56) References Cited

U.S. PATENT DOCUMENTS

| | | | |
|---|---|---|---|
| 6,622,291 B1* | 9/2003 | Ginetti | 716/108 |
| 7,844,931 B2* | 11/2010 | Hutzl et al. | 716/123 |
| 2004/0064798 A1* | 4/2004 | Alpert et al. | 716/6 |
| 2005/0268258 A1* | 12/2005 | Decker | 716/4 |
| 2006/0095879 A1* | 5/2006 | Brahme et al. | 716/6 |
| 2006/0294480 A1* | 12/2006 | Makino | 716/4 |
| 2007/0226660 A1* | 9/2007 | Ogawa | 716/2 |
| 2008/0244487 A1* | 10/2008 | Nitta et al. | 716/6 |
| 2009/0019412 A1* | 1/2009 | Yoshimura et al. | 716/9 |
| 2009/0024973 A1* | 1/2009 | Yamada | 716/6 |
| 2009/0249259 A1* | 10/2009 | Penzes et al. | 716/1 |
| 2010/0275167 A1* | 10/2010 | Fu et al. | 716/2 |

\* cited by examiner

*Primary Examiner* — Nha Nguyen
(74) *Attorney, Agent, or Firm* — Miles and Stockbridge P.C.

(57) ABSTRACT

To considerably reduce the cell layout change after timing optimization to reduce the term of layout design by estimating timing and an area after the timing optimization. During the period of initial layout processing using a net list, a timing constraint, a floor plan, a layout library, a timing library, etc., a library for estimating timing/area for estimating the timing and area after the timing optimization is created in advance and whether the timing constraint can be met is estimated. A cell in a path that hardly meets the timing constraint is placed in proximity and conversely, a cell that easily meets the timing constraint is placed at a distance. At this time, an area increase is also estimated so that wiring congestion does not occur.

2 Claims, 19 Drawing Sheets

FIG. 10
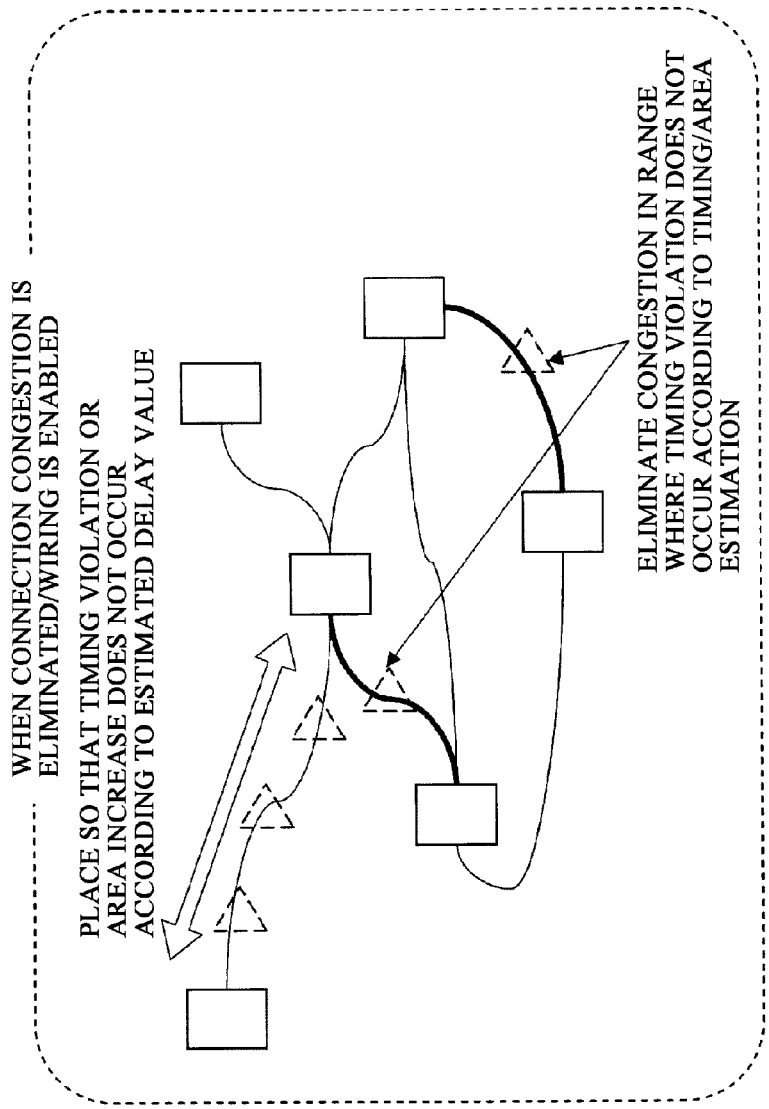
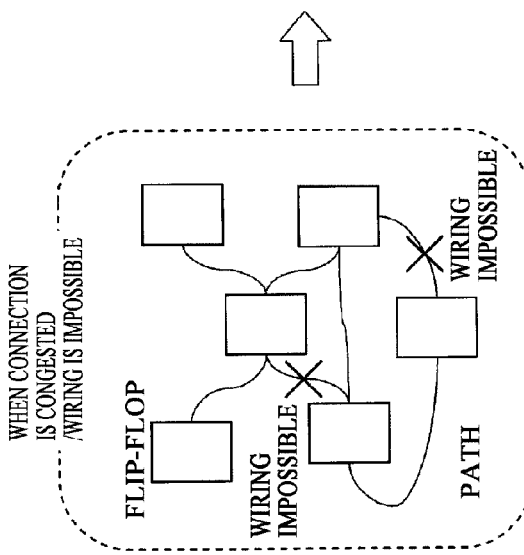

FIG. 11
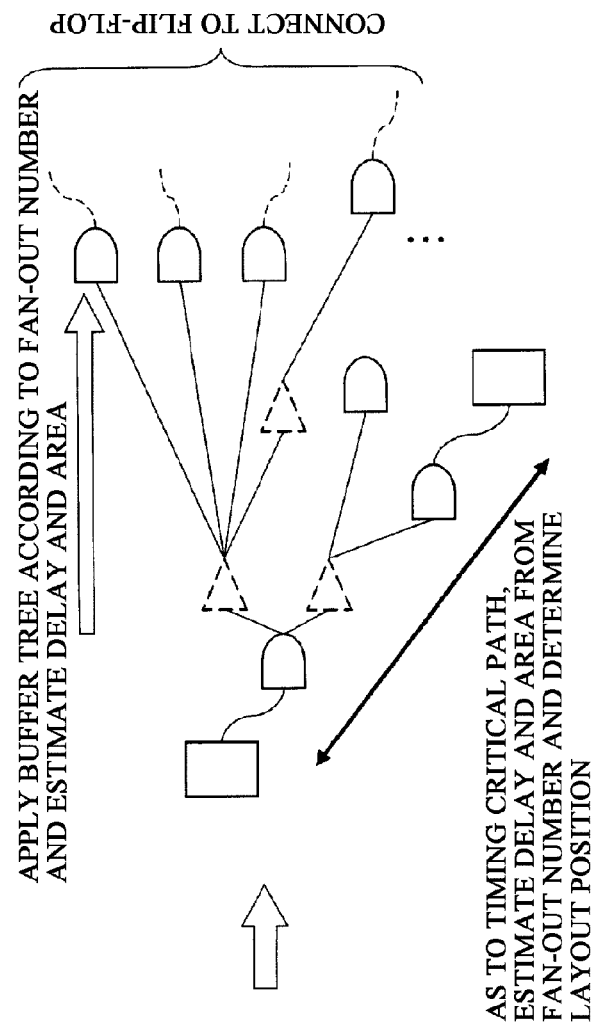
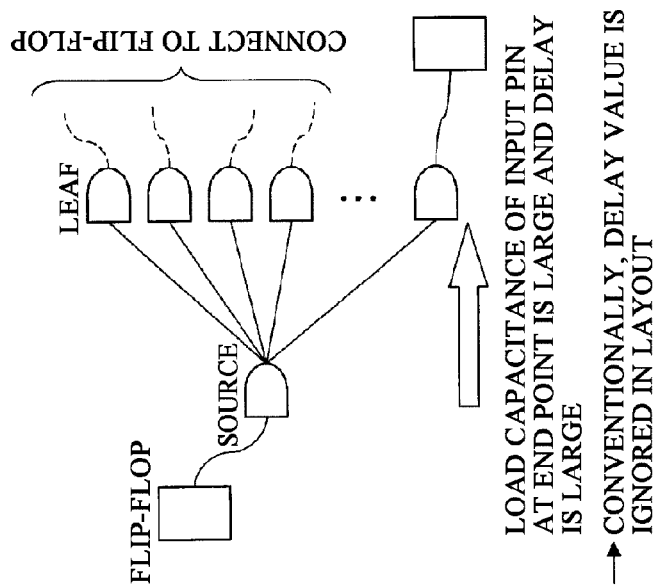

MINIMUM POINT OF INVERSE OF SPEED DIFFERS
DEPENDING ON DRIVE CAPABILITY

ESTIMATED AREA DIFFERS DEPENDING ON USED
DRIVE CAPABILITY EVEN WITH SAME DELAY VALUE

FIG. 22
BACKGROUND ART
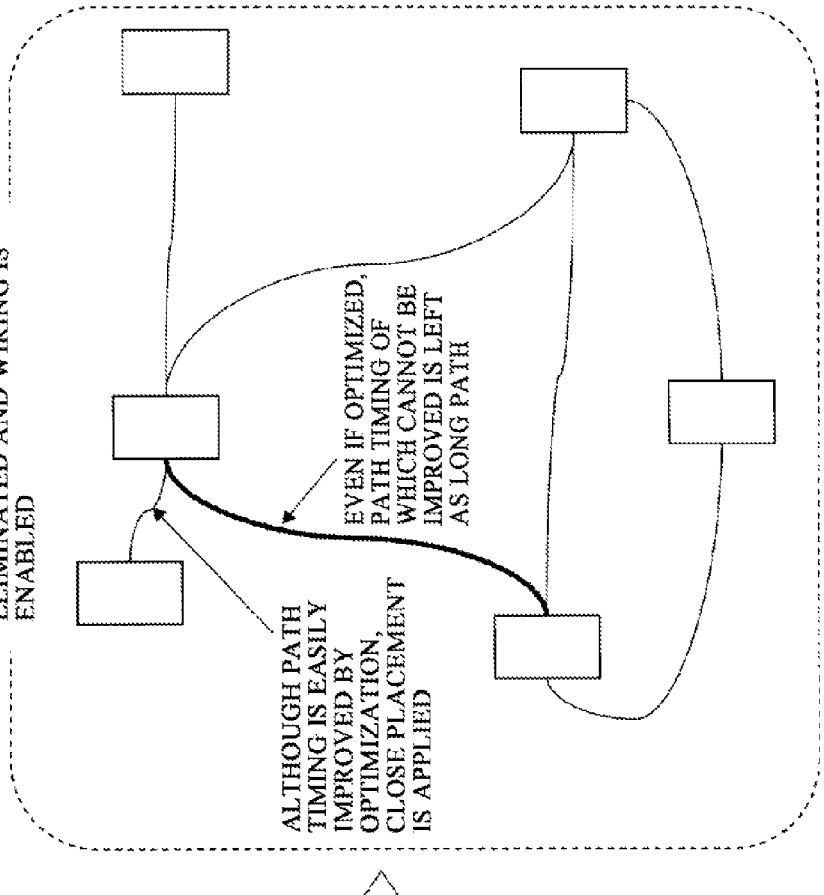
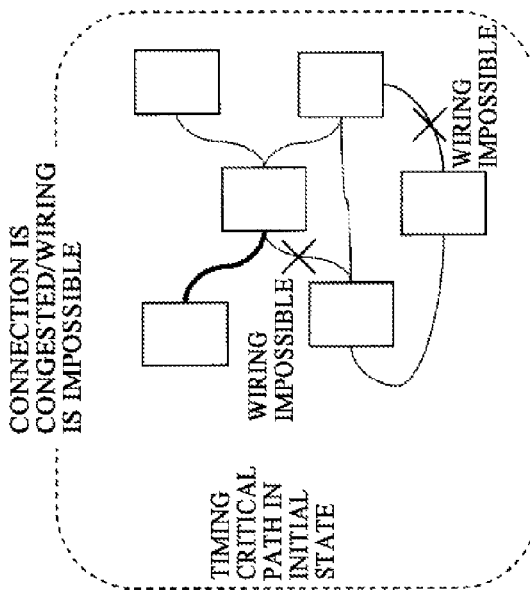

METHOD OF SEMICONDUCTOR INTEGRATED CIRCUIT DEVICE USING LIBRARY FOR ESTIMATING TIMING/AREA TO PLACE CELLS

CROSS-REFERENCE TO RELATED APPLICATION

The disclosure of Japanese Patent Application No. 2010-74219 filed on Mar. 29, 2010 including the specification, drawings and abstract is incorporated herein by reference in its entirety.

BACKGROUND OF THE INVENTION

The present invention relates to design technology of a semiconductor integrated circuit device and particularly, to technology effective for optimization processing of layout processing in a semiconductor integrated circuit device.

As layout design technology of a semiconductor integrated circuit device, for example, the use of an automatic layout design tool for automatically designing a layout, that is, a so-called electronic design automation (EDA) tool is widely known.

Upon receipt of coupling information (net list=logic circuit design result) of cells or macro cells, the automatic layout design tool automatically determines the positions of cells or macro cells over a semiconductor chip and places them and performs processing to automatically couple them etc.

As optimization technology of cell layout using this kind of EDA tool, for example, that which, as shown in FIG. 19, does not take into consideration the timing in an initial layout but improves the layout position or changes the floor plan based on the timing optimization result after the layout, or that which, as shown in FIG. 20, calculates timing in an initial state, places a critical timing path in the initial state in proximity and after optimization, changes the floor plan etc. if the timing does not converge, is known.

In the optimization technology of the cell layout shown in FIG. 19 and FIG. 20, a circuit to be given is a circuit (shown on the left side in FIG. 21 and on the left side in FIG. 22, respectively) configured by flip-flops and paths. Here, the path indicates a signal path configured by combined circuits. Elements configuring the flip-flop and the combined circuit are referred to as cells.

Optimization of cell layout is to determine cell positions so that wiring is possible with the minimum wiring length and a timing constraint given between flip-flops connected by a path in the timing optimization in the next step can be met.

SUMMARY OF THE INVENTION

The inventors of the present invention have found that the design technology of a semiconductor integrated circuit device described above has the following problems.

With the optimization method of cell layout shown in FIG. 19, only making wiring possible is considered, and therefore, as shown on the right side in FIG. 21, timing violation occurs, in which case, the timing constraint cannot be met in the timing optimization processing in the next or the area is increased, and there is a possibility that wiring is impossible.

Even if the layout is improved after the timing optimization, the timing with another path cannot be considered, and therefore, there is such a problem that timing violation occurs at another place or the area increases.

Further as shown in FIG. 19, when the timing constraint is not met even by the layout improvement after the timing optimization, it is necessary to change the shape of the cell placeable position (floor plan) and therefore the design term is lengthened.

In contrast, in the case of the optimization method of cell layout shown in FIG. 20, as shown in FIG. 22, a path that hardly meets the timing constraint (hereinafter, referred to as a critical path) is found in advance and an attempt is made to meet the timing constraint by the timing optimization in the next step by placing cells (including the flip-flops) in the critical path in proximity, however, there is a case where the determined critical path does not become a critical path after optimization but a different path becomes critical.

Because of this, as shown on the right side in FIG. 22, such a problem arises that, despite the fact that timing optimization is easy, the path is placed in proximity and wiring congestion occurs, or before timing optimization, the path that seems to meet the timing constraint comparatively easily is placed at a distance and it can no longer meet the timing constraint in the timing optimization processing. In this case, as shown in FIG. 20, the floor plan change is necessary, and therefore, an increase in the design term etc. is caused as a result.

The present invention has been made in view of the above circumstances and provides technology capable of considerably reducing the term required for the layout design of a semiconductor integrated circuit device by estimating timing and an area after timing optimization to considerably reduce the cell layout change after the timing optimization.

The other purposes and the new feature of the present invention will become clear from the description of the present specification and the accompanying drawings.

The following will explain briefly the outline of a typical invention among the inventions disclosed in the present application.

The present invention relates to a design method of a semiconductor integrated circuit device for automatically placing cells using an electronic system, wherein during the period of cell layout processing by a layout program, a library for estimating timing/area for estimating timing and an area created in advance is used to estimate a timing constraint and an area increase after timing optimization and to place cells so that wiring congestion does not occur while meeting the timing constraint.

In the present invention, the library for estimating timing/area includes a library for estimating long wires, a library for estimating multi fan-outs, and a library for estimating multi-stage logic resulting in a path the timing of which before layout is different.

Further, in the present invention, the library for estimating long wires includes a library of estimated delay values and estimated cell areas in accordance with distances by cell drive capability change and buffering by changing the cell wiring distance.

Furthermore, in the present invention, the library for estimating multi fan-outs includes a library of delay values estimated from the number of stages of the buffer tree and areas estimated from the buffer number by changing the fan-out number and estimating the number of stages of the buffer tree and buffer number required for division.

The following will further explain briefly the outline other inventions of the present application.

In the present invention, the library for estimating multi-stage logic includes a library of estimated delay values and areas when the load of a wire is set to substantially zero to extract a timing critical path group and optimization is performed after the required frequency is made severer than the frequency to be used.

In the present invention, the library for estimating long wires includes a library of estimated delay values and areas on the assumption that the point where the inverse of speed is minimal for the wiring distance is buffered.

In the present invention, the library for estimating multi fan-outs includes a library of estimated delay values and areas on the assumption that the point where the inverse of speed for the wiring distance is minimal is buffered.

In the present invention, the point where the inverse of speed is minimal for the wiring distance is found for each of two or more different buffer drive capabilities and the library for estimating long wires estimates the delay value and the area, respectively, based on the point where the inverse of speed found for each of the two or more different buffer drive capabilities is minimal.

In the present invention, the point where the inverse of speed is minimal for the wiring distance is found for each of two or more different buffer drive capabilities and the library for estimating multi fan-outs estimates the delay value and the area, respectively, based on the point where the inverse of speed found for each of the two or more different buffer drive capabilities is minimal.

The following will explain briefly the effect acquired by the typical invention among the inventions disclosed in the present application.

(1) The considerable layout change of cells after timing optimization can be obviated, and therefore, it is possible to efficiently make the layout design in a semiconductor integrated circuit device.

(2) Because of (1) described above, it is possible to reduce the design term of a semiconductor integrated circuit device.

BRIEF DESCRIPTION OF THE DRAWINGS

FIG. 10 is an explanatory diagram showing an example of processing to place cells while estimating the timing and area of a long wire by incorporating the library for estimating long wires in FIG. 3 in a layout program;

FIG. 11 is an explanatory diagram showing an example when performing cell layout processing while estimating the timing and area of the multi fan-outs by incorporating the library for estimating multi fan-outs in FIG. 4 in the cell layout program;

FIG. 22 is an explanatory diagram showing problems in the cell layout processing in FIG. 19.

DETAILED DESCRIPTION OF THE PREFERRED EMBODIMENTS

Embodiments of the present invention will be explained below in detail based on the drawings. In all the drawings for explaining the embodiments, the same symbol is attached to the same member, as a principle, and the repeated explanation thereof is omitted.

In the present embodiment, the optimization method of cell layout in a semiconductor integrated circuit device is processed by an electronic system including a computer system, for example, a personal computer or workstation.

An electronic system includes, for example, an input part, a central processing unit, an output part, a database, etc. The input part is a keyboard etc. with which various kinds of data can be input and to the input part, the central processing unit is coupled.

The output part includes, for example, a display and a printer, and displays data input from the input part, a result calculated by the central processing unit, etc., or outputs a print. In the database, data, such as information about various layouts used in the layout design in the semiconductor integrated circuit device is stored.

Figure 1:
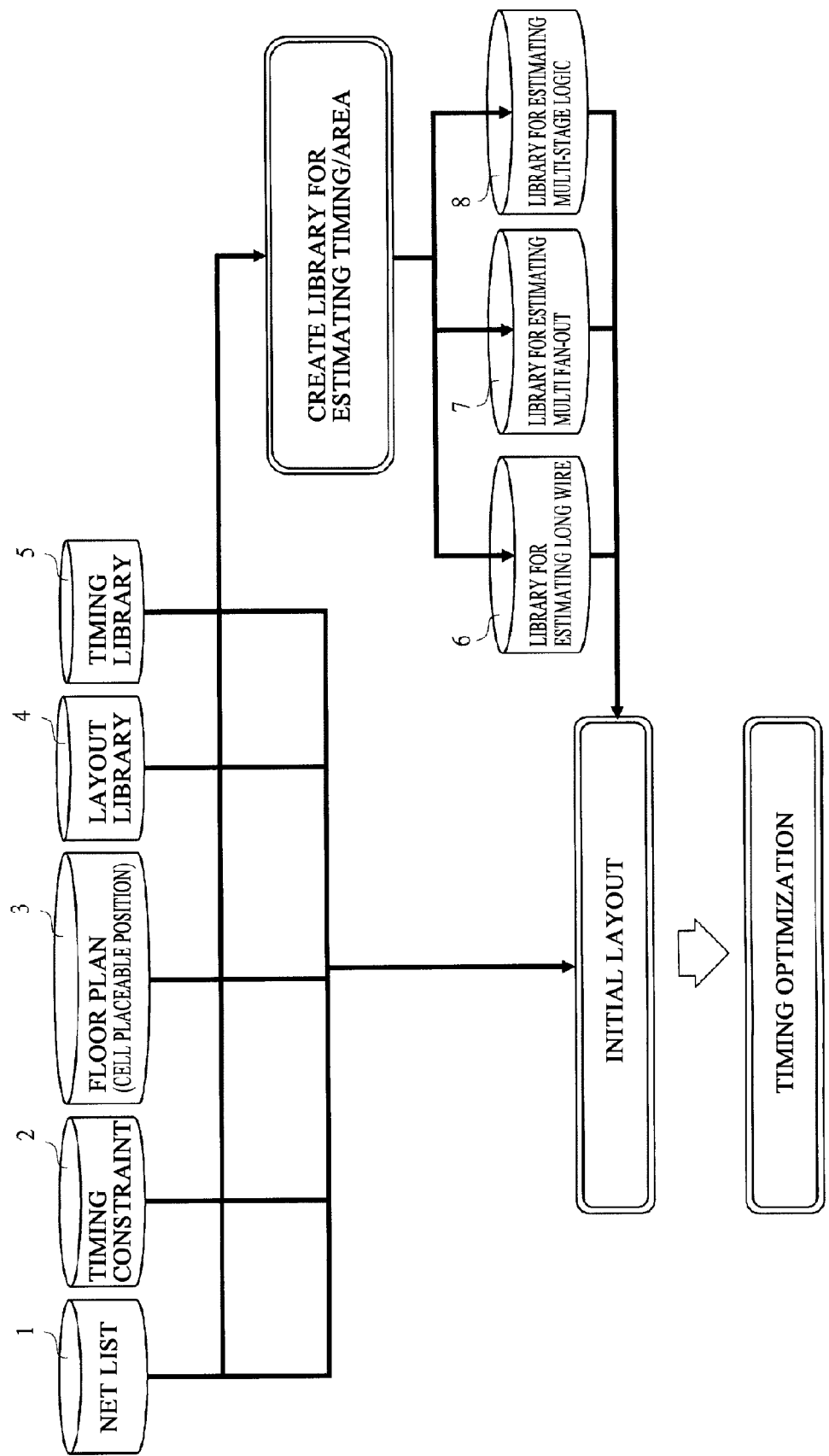
FIG. 1 is an explanatory diagram showing an example of initial cell layout processing according to an embodiment of the present invention.

FIG. 1 is an explanatory diagram showing an example of cell initial layout processing.

As shown schematically, during the initial layout processing using a net list 1, a timing constraint 2, a floor plan 3, a layout library 4, a timing library 5, etc., a library for estimating timing/area for estimating timing and an area after timing optimization is created in advance and whether the timing constraint 2 can be met is estimated.

In this case, a cell in a path that hardly meets the timing constraint 2 is placed in proximity and conversely, a path that easily meets it is placed at a distance. At this time, an area increase is also estimated so that wiring congestion does not occur. A path indicates connection between flip-flops and a combined logic cell in between and coupling between cells is referred to as a signal.

Here, the cell refers to a basic unit element configuring a buffer, inverter, flip-flop, AND (circuit)), OR (circuit), NAND (circuit), NOR (circuit), etc. Normally, even the cell having the same logical function comprises a plurality of variations whose output load drive capabilities are changed.

The net list 1 describes the cell coupling of the semiconductor integrated circuit device, corresponding to a circuit diagram and wire coupling information. The floor plan 3 is a file that defines a cell placeable region in the layout. Regions where cells cannot be placed include, for example, an I/O (Input/Output) region, memory, power source circuit region, etc.

For a block on the net list 1 (such as that which should be regarded as one block because relationship between logical functions is strong), there is a case where partitioning (region specification) is performed on the floor plan 3 and an area is roughly specified.

The timing constraint 2 is a constraint that stipulates a delay time of data transfer between flip-flops. Normally, the delay time is set by the rate (frequency) of a clock signal to be supplied to the flip-flop. Because a plurality of different clock signals having a plurality of different rates (frequencies) is defined between flip-flops, or the setting is done so that the delay time between specific flip-flops is ignored as a design request, the delay times set between flip-flops differ from flip-flop to flip-flop.

The timing library 5 describes timing for each cell determined by an output load (RC). For example, for output loads "10 pf, 20 pf, 30 pf, 40 pf", the delay times for the cell are calculated and the delay times are described in a lookup table form, such as "10 pf→5 ps, 20 pf→8 ps, 30 pf→10 ps, 40 pf→14 ps". In order to ensure the precision of the delay time defined in the lookup table form, the maximum fan-out number is also defined. The maximum fan-out number indicates the number of cells in the next stage that can be coupled in parallel with the output of the cell.

The layout library 4 describes the cell frame (dimensions of length and width), cell area, and in-cell pattern and in-cell pattern include a terminal pattern to couple a signal and a wiring blocking pattern to set a part through which a wire cannot be run over the cell.

The library for estimating timing/area includes a library for estimating long wires 6, a library for estimating multi fan-outs 7, and a library for estimating multi-stage logic 8 resulting in a path with the condition the timing before layout of which is different, as shown on the right side in FIG. 1.

Figure 2:
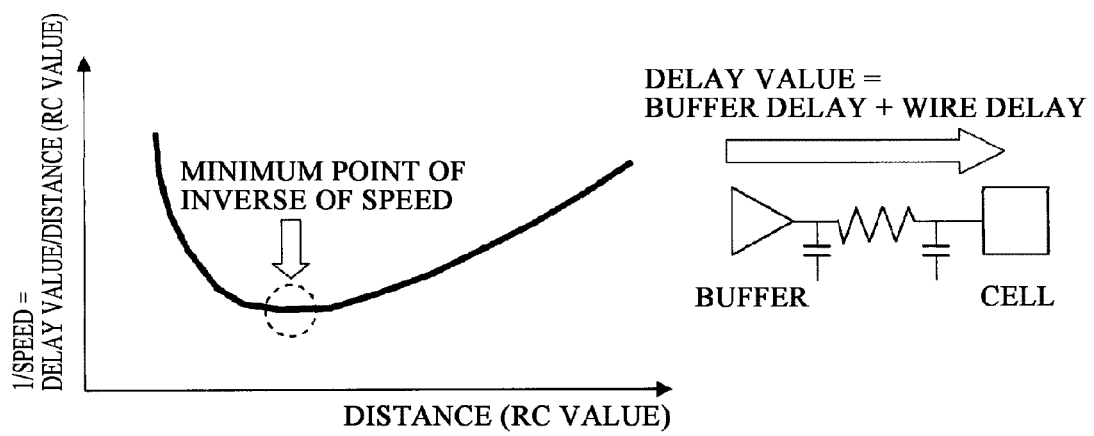
FIG. 2 is an explanatory diagram showing an example of a buffering position at the time of the creation of a library for estimating timing/area used in the initial cell layout processing in FIG. 1.

FIG. 2 is an explanatory diagram showing an example for determining a buffering (buffer inserting) position at the time of the creation of the library for estimating timing/area.

When buffering is performed for a signal path between cells by inserting a buffer thereinto, a cell delay and a delay of a wire driven by the buffer occur as shown on the right side in FIG. 2. The delay value is the total of the buffer delay and the delay of the wire driven by the buffer. The inverse of speed obtained by delay value/distance (in the case of the wire, a resistance R and a capacitance C increase in proportion to distance, and therefore, it can be considered by replacing with the resistance R or capacitance C. In the case of the fan-out, the capacitance C increases, and therefore, it is considered by the capacitance C) is minimal at a point at a certain distance as shown in the graph on the left side in FIG. 2.

The reason for this is that when the distance between the buffer and the next stage cell is short, the distance, which is the denominator, becomes short, however, the amount of buffer delay is substantially fixed, and therefore, the inverse of speed increases and when the distance increases, the wire delay of the amount of delay, which is the numerator, increases, and therefore, the inverse of speed increases also in this case. In other words, the point where the inverse of speed becomes minimal is a point where the speed becomes maximum.

This point is best for buffering. The number of the buffering optimum points is one according to calculations, however, as can be seen from the graph on the left side in FIG. 2, in the vicinity of the minimum point, there exists a region from which substantially the same effect in practical use as that obtained from the minimum value can be obtained.

Consequently, it is possible to appropriately select a point where buffering is performed from among points in a range having a certain width with the point where the inverse of speed is minimal as a center. For example, when an increase in wiring distance is desired by somewhat increasing the wire length from the buffer to the cell, it is possible to use a method of employing a point 1% to 50% longer from the point where the inverse of speed becomes minimal.

Conversely, when it is desired to create a library for low power consumption by reducing charging/discharging power, it is also possible to select a distance 1% to 50% shorter from the point where the inverse of speed becomes minimal. When creating the library for estimating long wires 6 and the library for estimating multi fan-outs 7, the delay and area are estimated by using this buffering method.

The library for estimating long wires 6 creates a lookup table by calculating the delay times when changing the cell drive capability or performing buffering at the optimum distance for several assumed wiring distances.

The library for estimating multi fan-outs 7 creates a lookup table by calculating the delay times when changing the cell drive capability by using the capacitance C corresponding to the fan-out number or performing buffering with the optimum buffer size.

Figure 3:
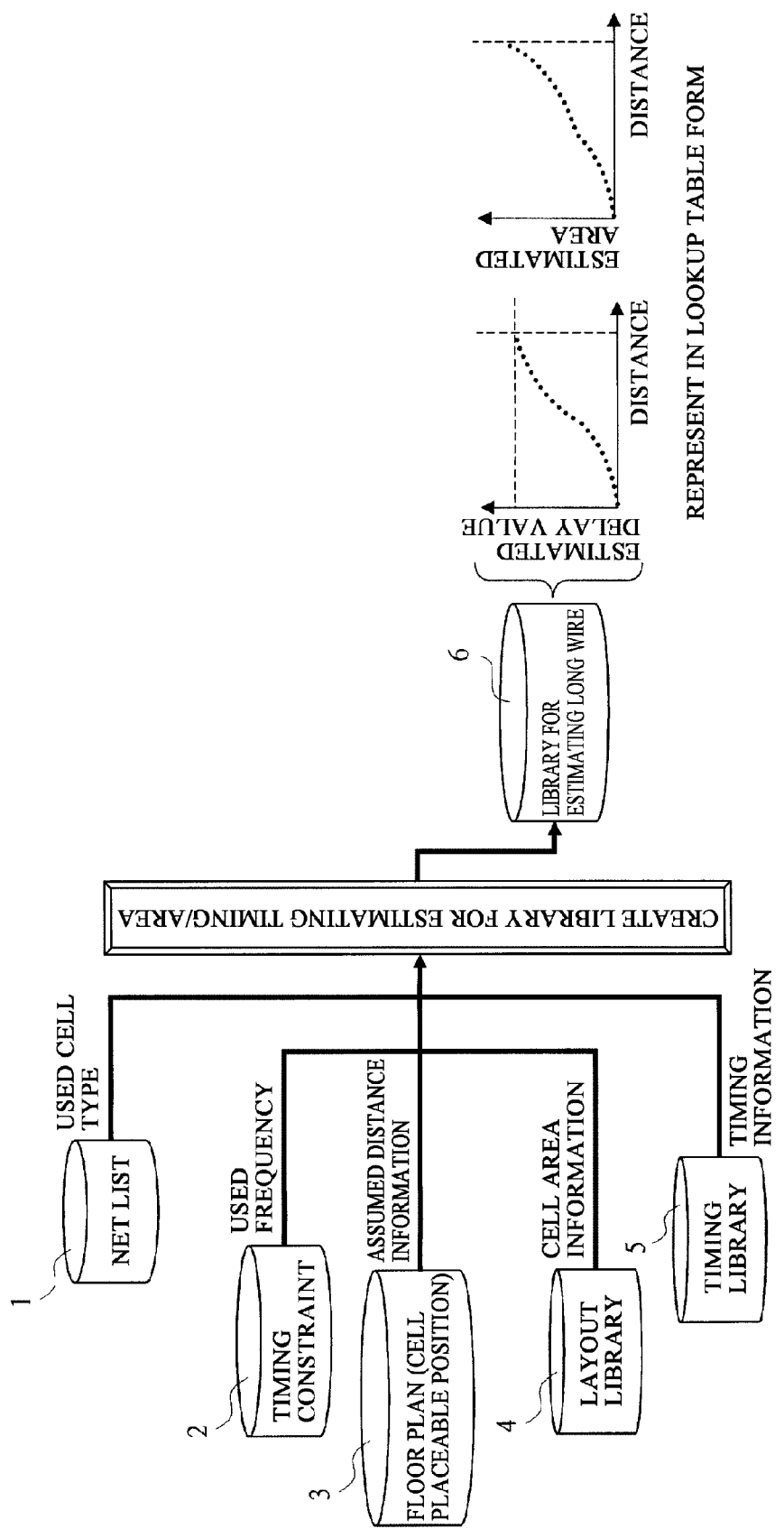
FIG. 3 is an explanatory diagram showing an example of the creation of a library for estimating long wires configuring the library for estimating timing/area in FIG. 2.

FIG. 3 is an explanatory diagram showing an example of the creation of the library for estimating long wires 6.

The library for estimating long wires 6 is created by information on cell type to be used from the net list 1, frequency information to be used from the timing constraint 2, assumed (wiring) distance information from the floor plan 3, cell area information from the layout library 4, timing information of the timing library 5, etc. as shown schematically.

First, the delay value and the total area in accordance with distance are estimated by changing the distance (value of the resistance R or the capacitance C) from a small one to a large one for each fixed value and changing the cell drive capability or performing buffering. The estimation of the delay value by changing the cell drive capability is done only for the cell type to be used.

The estimated delay and area are found for distances changed for each fixed value and stored in, for example, the lookup table form.

When changing distances, the minimum value and the maximum value of the distance that the wire can take on are found from the floor plan 3 and distances are changed only in the range. When the estimated delay value exceeds the timing constraint, the processing to find an estimated value exits.

Doing the estimation of delay value by changing the drive capability only for the cell type to be used reduces the processing time. As shown on the right side in FIG. 3, by plotting the distance (R or C value), the estimated delay value, and the estimated area, the library for estimating long wires 6 is created.

Figure 4:
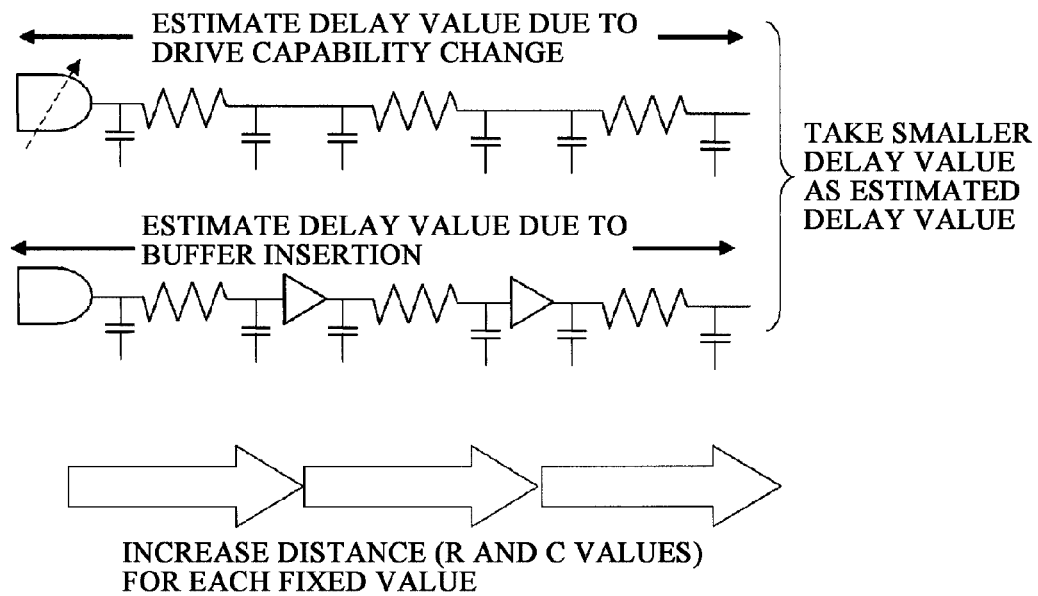
FIG. 4 is a detailed explanatory diagram in creating the library for estimating long wires shown in FIG. 3.

FIG. 4 is a detailed explanatory diagram at the time of the creation of the library for estimating long wires 6 shown in FIG. 3.

First, when creating the library for estimating long wires 6, as shown on the upper side in FIG. 4, a delay value that becomes minimal due to drive capability change is estimated from the timing library 5. Subsequently, as shown on the lower side in FIG. 4, division of distance is made to obtain a distance that gives the minimum inverse of speed by buffering (inserting a buffer) and a delay value including the cell delay of the inserted buffer and the wire delay is estimated.

Then, a smaller one is selected from the two estimated delay values and it is taken as an estimated delay value and an estimated area of the library for estimating long wires 6. At this time, the distance at which buffering is performed is the point at which the inverse of speed is minimal (shown by a dotted circle) shown in FIG. 2.

Figure 5:
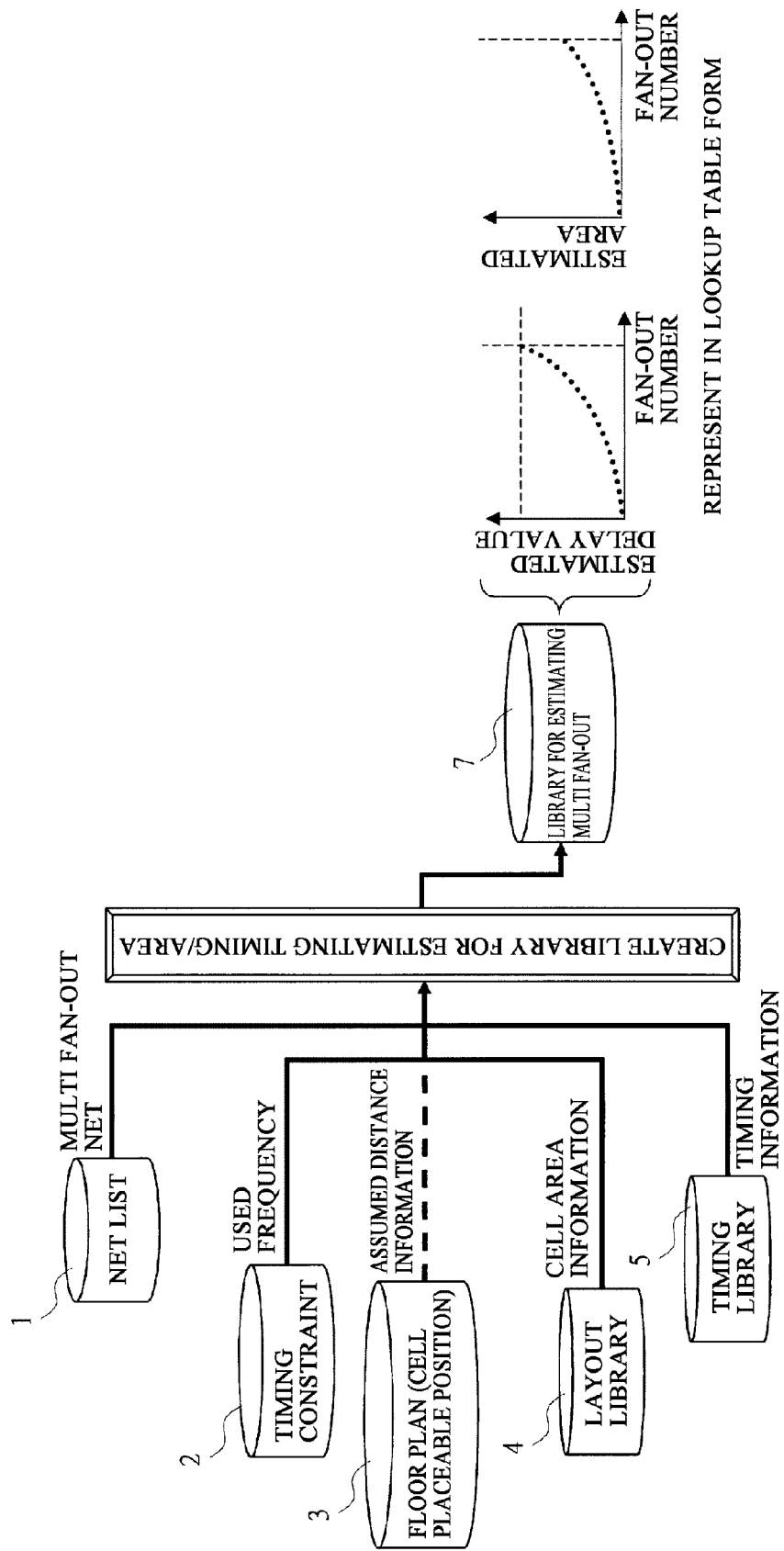
FIG. 5 is an explanatory diagram showing an example of the creation of a library for estimating multi fan-outs configuring the library for estimating timing/area in FIG. 2.

FIG. 5 is an explanatory diagram showing an example of the creation of the library for estimating multi fan-outs 7.

As shown on the left side in FIG. 5, the library for estimating multi fan-outs 7 is created by using multi fan-outs net information from the net list 1, information on frequency to be used from the timing constraint 2, assumed (wiring) distance information from the floor plan 3, cell area information from the layout library 4, timing information of the timing library 5, etc.

The multi fan-outs refer to a signal of the fan-out number exceeding the maximum fan-out number determined in the timing library 5 in the circuit. In this case, the number of the stages of the buffer tree and the buffer number necessary for division are estimated by changing the fan-out number from a small one to a large one. The delay value is estimated from the number of the stages of the buffer tree and the area is estimated from the buffer number.

The library for estimating multi fan-outs 7 is created only for the range of the multi fan-outs in the net given. Then, as shown on the right side in FIG. 5, by plotting the fan-out number and the estimated delay value and area, the library for estimating multi fan-outs 7 is created.

Figure 6:
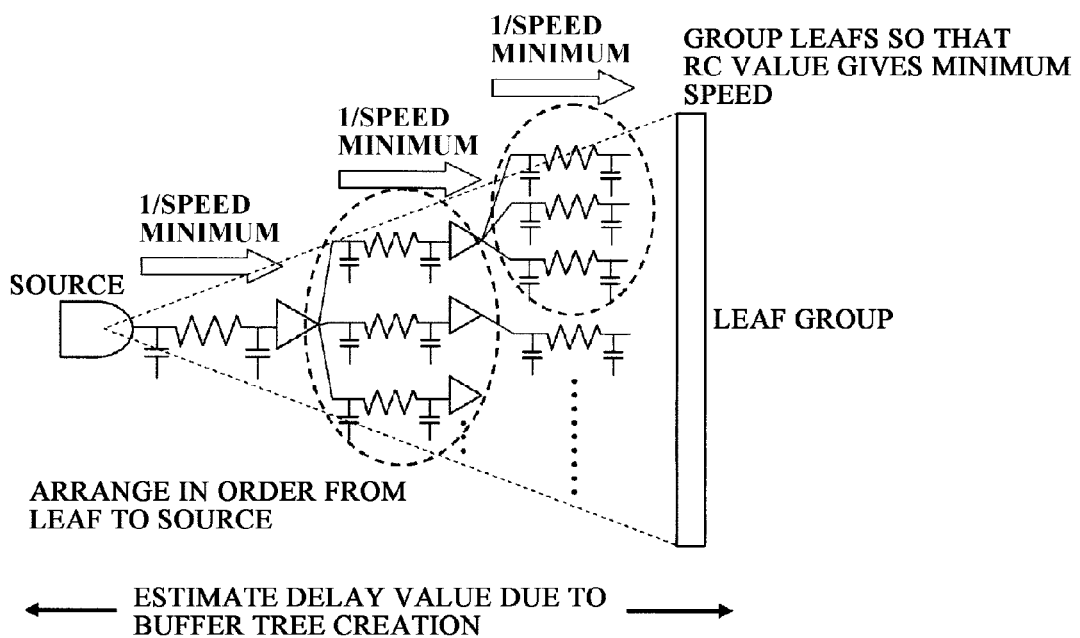
FIG. 6 is a detailed explanatory diagram in creating the library for estimating multi fan-outs shown in FIG. 5.

As shown in FIG. 6, the multi fan-outs include one source that drives and a leaf group that is driven. At the time of the creation of the library for estimating multi fan-outs, the leaves are grouped and buffered so that the R or C value gives the minimum inverse of speed shown in FIG. 2.

Further, the grouped buffer group is buffered at a time so that the inverse of speed becomes minimal. This is repeated until the source is reached. In this manner, after buffering, the delay from the source to the leaf is taken as an estimated delay and the total area of the buffers as an estimated area.

Figure 7:
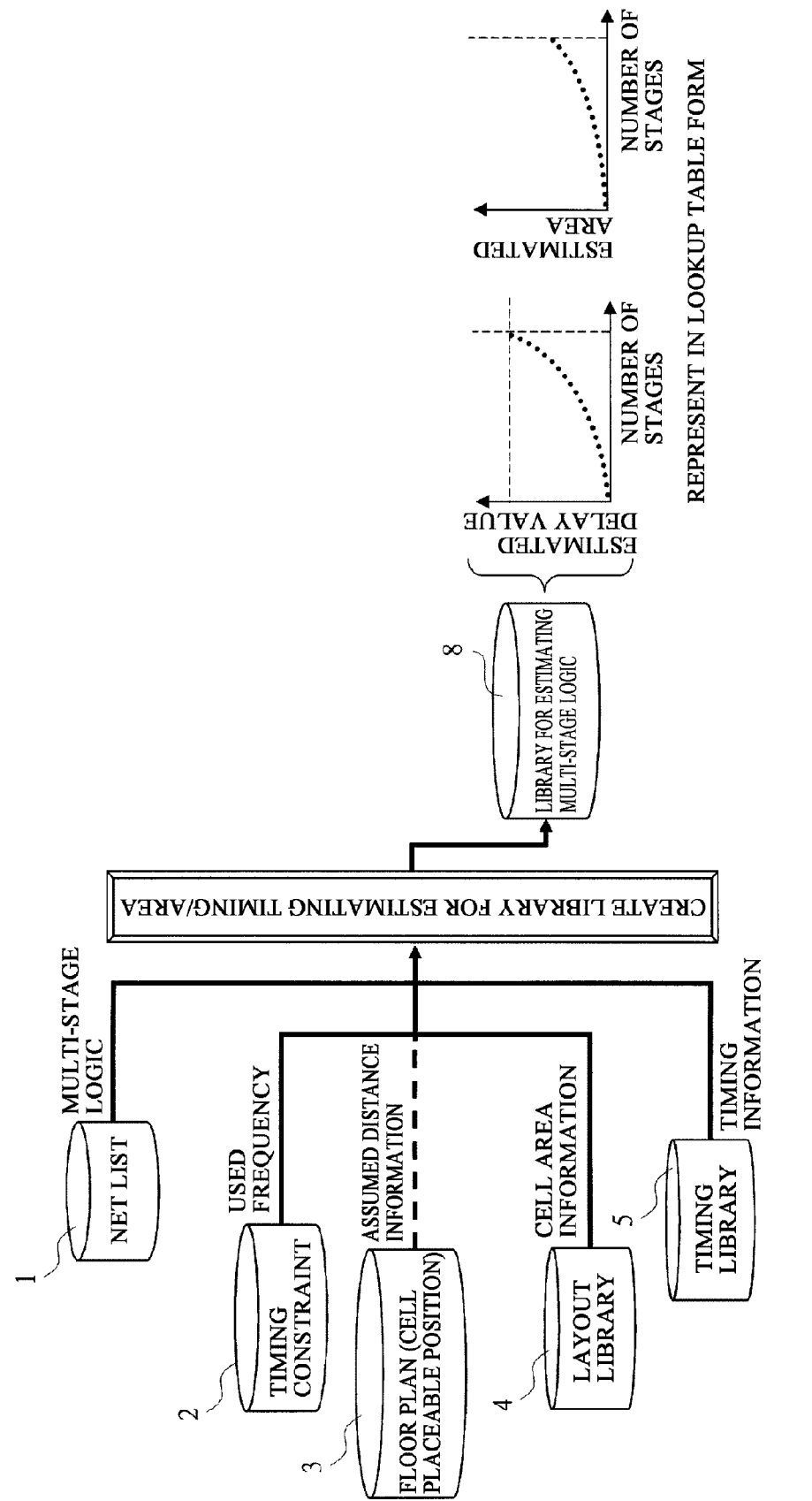
FIG. 7 is an explanatory diagram showing an example of the creation of a library for estimating multi-stage logic configuring the library for estimating timing/area in FIG. 2.

FIG. 7 is an explanatory diagram showing an example of the creation of the library for estimating multi-stage logic 8.

As shown on the left side in FIG. 7, the library for estimating multi-stage logic 8 is created by multi-stage logic information from the net list 1, information on frequency to be used from the timing constraint 2, assumed (wiring) distance information from the floor plan 3, cell area information from the layout library 4, timing information of the timing library 5, etc.

In this case, the load of the wire is set to zero (or a very small value) and a timing critical path (multi-stage logic part) group having a number of gates through which a signal passes is extracted, and the delay value and the area are estimated by making the requested frequency severer than the frequency to be used (delay value between the flip-flops under the timing constraint) for optimization. When the delay time no longer arrives at the target for the requested frequency set severer, the optimization of the path exits.

Figure 8:
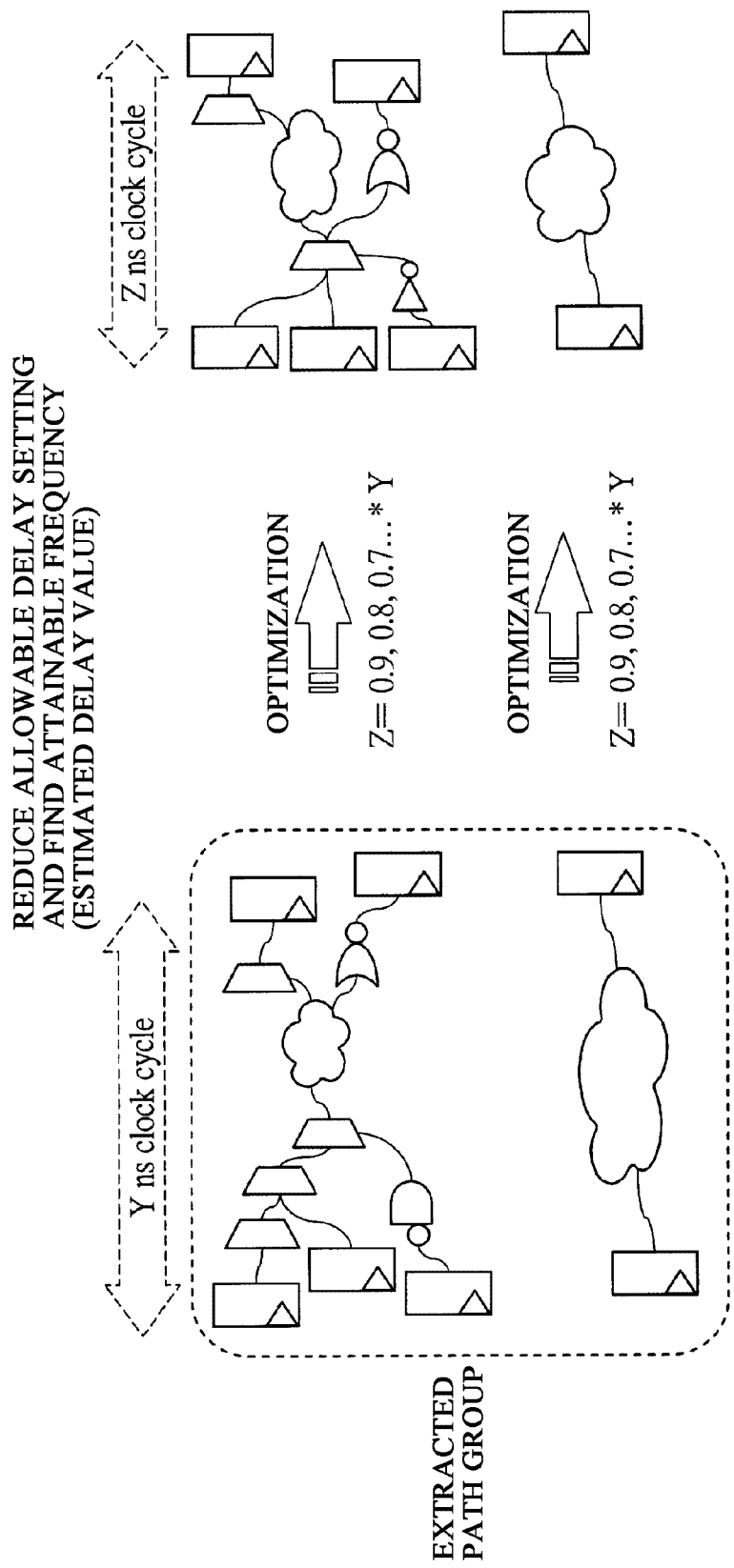
FIG. 8 is a detailed explanatory diagram showing an example of the creation of the library for estimating multi-stage logic shown in FIG. 7.

Then, by plotting the initial number of stages, the requested frequency (estimated delay value), and the area as shown on the right side in FIG. 7, the library for estimating multi-stage logic 8 is created. At the time of the creation of the library for estimating multi-stage logic 8, as shown in FIG. 8, if there is not a common part in the extracted path group, optimization is performed in parallel. In FIG. 8, 'Z' represents the allowable delay time of the path corresponding to the requested frequency and 'Y' represents the delay time of the path corresponding to the frequency to be used.

Figure 9:
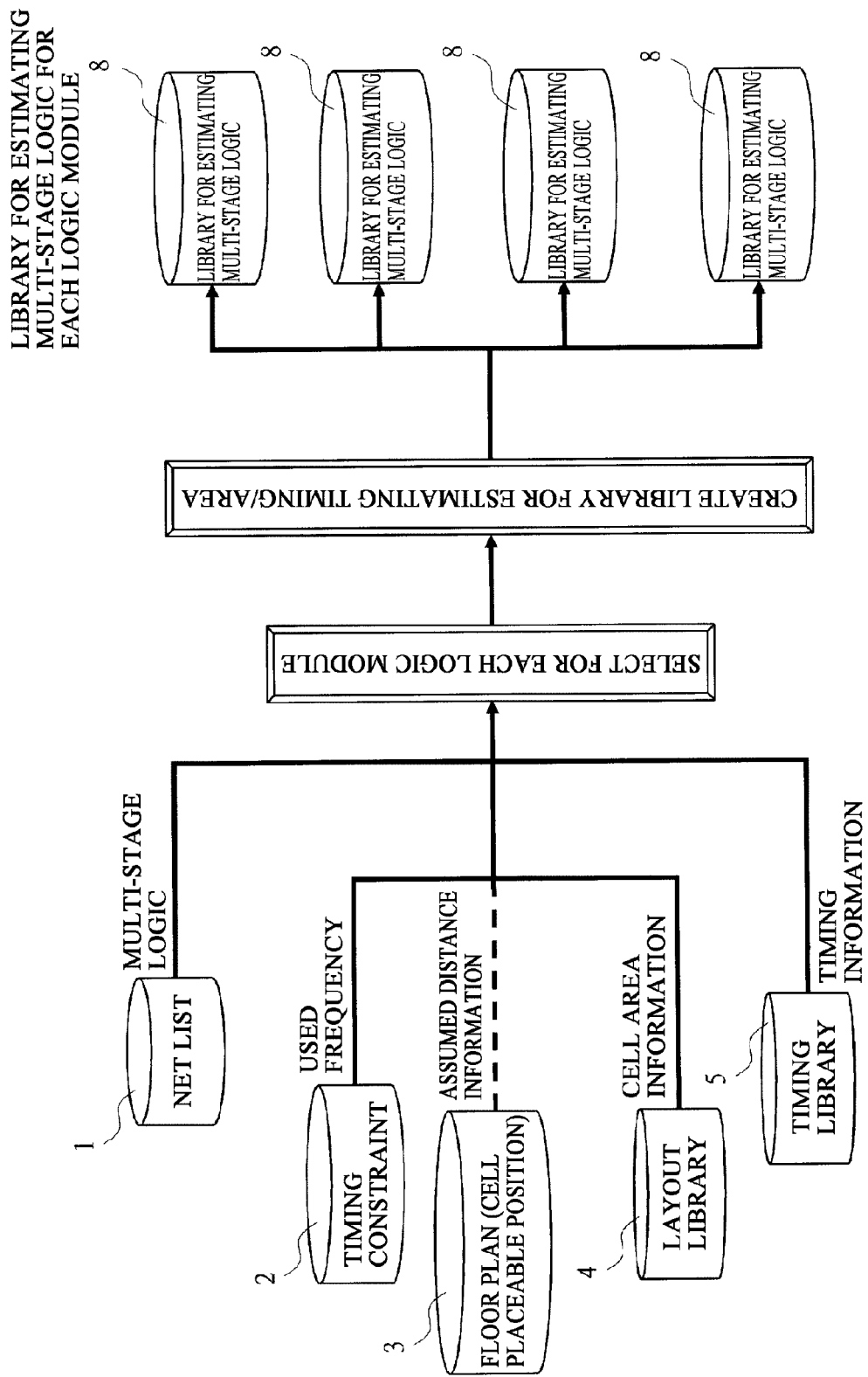
FIG. 9 is a detailed explanatory diagram showing another example of the creation of the library for estimating multi-stage logic shown in FIG. 7.

The library for estimating multi-stage logic 8 may be created for the whole circuit, however, if it is possible to divide the extracted path group for each logic module as shown in FIG. 9, the library for estimating multi-stage logic 8 may be created for each logic module.

By doing so, it is possible to create the library for estimating multi-stage logic 8 with higher precision. Further, if the number of the critical paths is small, it may also be possible to create a library of exclusively estimating an extracted critical path.

FIG. 10 is an explanatory diagram showing an example of processing to place cells while estimating the timing and area of a long wire by incorporating the library for estimating long wires in the cell layout program.

As shown on the left side in FIG. 10, when wiring is impossible due to connection congestion, it is necessary to place a cell at a distance to enable wiring. Consequently, as shown on the right side in FIG. 10, by using the values of the estimation of delay and the estimation of area of the library for estimating timing/area, the cell is placed at a distance to eliminate the congestion in a range where timing violation does not occur.

At this time, by using the values of the estimation of delay and the estimation of area, cells are moved so that timing violation or an increase in the total area does not occur after the timing optimization in the next step to obtain the result of wiring possible layout.

For example, even for a cell that is a critical path, when timing violation or an area increase does not occur after the timing optimization in the next step by the estimated delay value, it is possible to place a flip-flop at a distance and even for a cell that is not a critical path, when timing violation etc. occurs after the timing optimization in the next step by the estimated delay value, the flip-flop is placed in proximity.

FIG. 11 is an explanatory diagram showing an example when cell layout processing is performed while estimating the timing and the area of the multi fan-outs by incorporating the library for estimating multi fan-outs in the cell layout program.

In general, in the cell layout processing, as shown on the left side in FIG. 11, the layout processing is performed at first by ignoring the multi fan-out delay, however, here, the delay and the area are estimated according to the fan-out number. That is, the buffer tree is applied while keeping the delay to a minimum by using the library for estimating multi fan-outs.

As to the timing critical path, it is necessary to place the flip-flop at a distance in order to enable wiring in the timing optimization in the next step by estimating the delay from the fan-out number. At this time, as shown on the right side in FIG. 11, by estimating the delay value and the area, it is possible to move the flip-flop so that the timing violation or an area increase does not occur after the timing optimization in the next step and to obtain the result of wiring possible layout.

Figure 12:
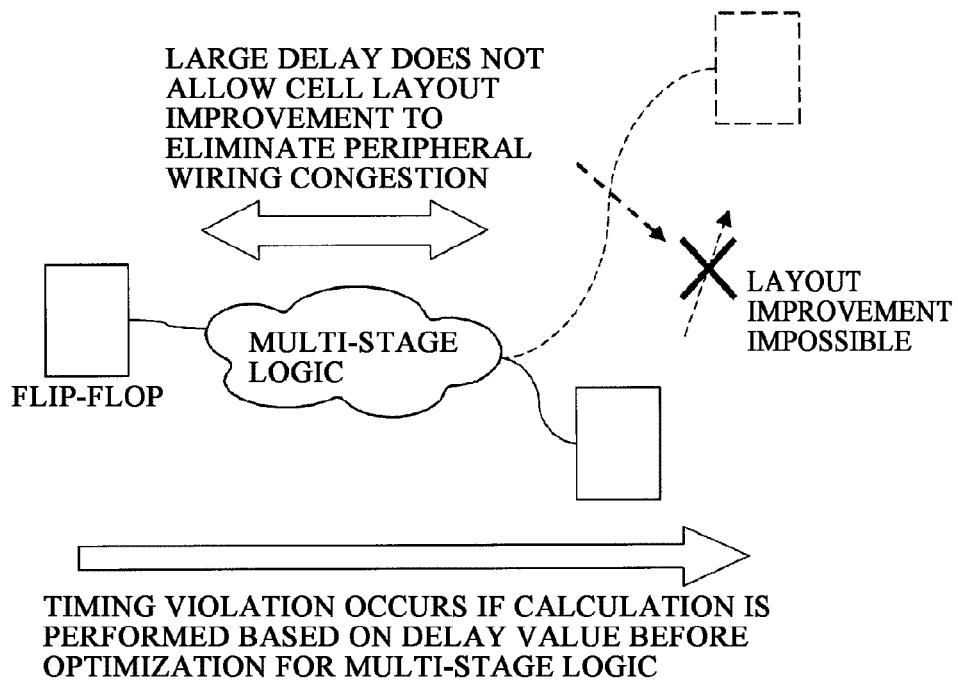
FIG. 12 is an explanatory diagram showing an example of timing violation in general multi-stage logic.
Figure 13:
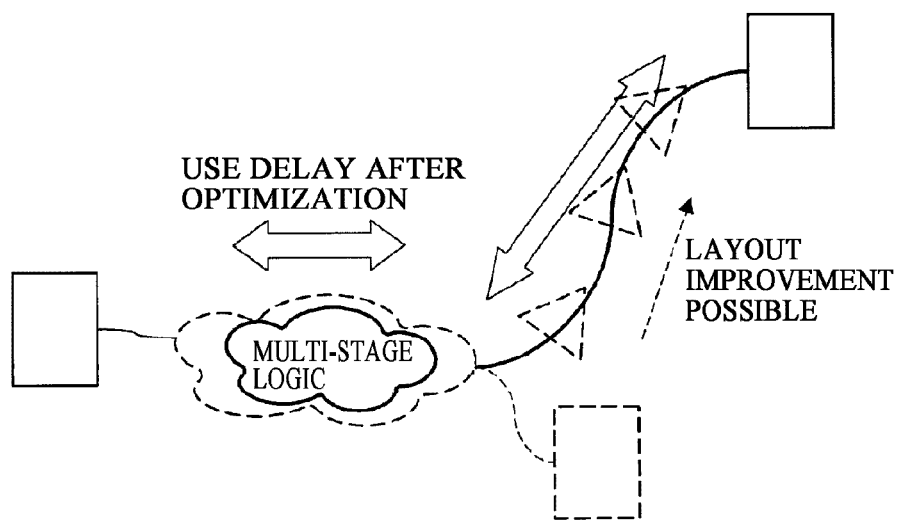
FIG. 13 is an explanatory diagram showing an example when performing layout process processing is performed while estimating the timing and area of a path with a large number of logic stages by incorporating the library for estimating multi-stage logic in FIG. 7 in the cell layout program.

FIG. 12 is an explanatory diagram showing an example of timing violation in the multi logic and FIG. 13 is an explanatory diagram showing an example when layout processing is performed while estimating the timing and area of a path with a number of logical stages by incorporating the library for estimating multi-stage logic in the cell layout program.

In general, when the multi-stage logic exists and timing is severe, if calculation is made based on the delay value before optimization for the multi-stage logic, timing violation occurs and the flip-flop cannot be moved to enable wiring as shown in FIG. 12.

In contrast, according to the present invention, as shown in FIG. 13, it is possible to estimate timing after the optimization of the multi-stage logic by using the library for estimating multi-stage logic, and therefore, it is possible to determine that the timing constraint can be met by the timing optimization in the next step even if the flip-flop is moved. Due to this, it is made possible to move the flip-flop and to enable wiring. At this time, by using the library for estimating long wires, the timing and area after the timing optimization when the cell is moved are estimated.

Next, an estimation technique with high precision in the library for estimating timing/area is explained.

Figure 14:
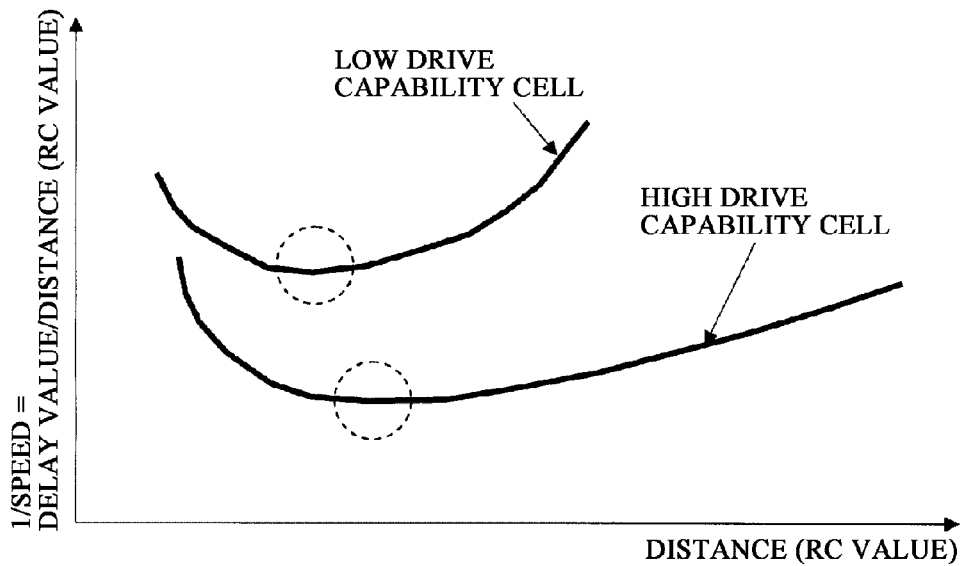
FIG. 14 is an explanatory diagram showing an example of a difference in the minimum point of inverse of speed between a low drive capability cell and a high drive capability cell.

In order to improve the precision of the libraries for estimating long wires and multi fan-outs, the estimated values of area and delay are found for each buffer drive capability. This is because the minimum points of the inverse of speed are different between the low drive capability cell and the high drive capability cell as shown in the graph in FIG. 14.

Figure 15:
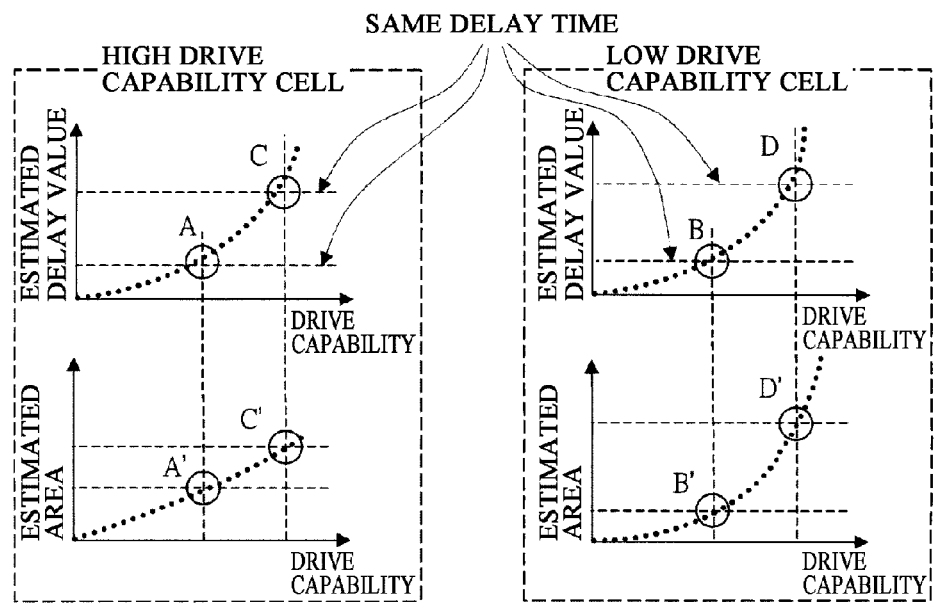
FIG. 15 is an explanatory diagram showing an example of a method of finding an estimated area and an estimated delay value by the high drive capability cell and the low drive capability cell.

For example, even if the delay value is the same, there may be a case where the estimated areas are different between the high drive capability cell shown in the graph on the left side in FIG. 15 and the low drive capability cell shown in the graph on the right side in FIG. 15. For example, in the high drive capability cell, when the drive capability is comparatively small, the estimated area when the delay time is at a point A is a point A', however, in the low drive capability cell, the estimated area when the same delay time is at a point B is a point B', and therefore, it is possible to realize the same delay time with an area smaller than the estimated area A' in the high drive capability cell.

In contrast, in the case of a comparatively large delay time, the estimated areas when the same delay time is at points C and D are points C' and D' in the high drive capability cell and in the low drive capability cell, respectively, and the area is smaller in the high drive capability cell.

Due to this, the minimum estimated delay value in accordance with the cell drive capability is selected and the library obtained by plotting the estimated delay and the estimated area or putting them into a table for the distance and the fan-out number is used for the timing critical type or path.

In contrast, the minimum estimated area value is selected and the library obtained by plotting the estimated delay and the estimated area or putting them into a table for the distance and the fan-out number is applied to the high density type or path. That is, in the high drive capability cell, the minimum estimated delay value A (the graph on the top-left side in FIG. 15) is selected and as the estimated area value, the estimated area value A' (the graph on the bottom-left side in FIG. 15) corresponding to the minimum value A is selected and used for the timing critical type or path.

In the low drive capability cell, the minimum estimated area value B (the graph on the top-right side in FIG. 15) is selected and as the estimated delay value, the estimated delay value B' (the graph on the bottom-right side in FIG. 15) corresponding to the minimum value B is selected and used for the high density type or path.

Besides the above, in order to improve the precision of the library for estimating multi-stage logic, it may also be possible to find number of signals to be coupled to one cell after the optimization for estimating logic/number of cells (=estimated number of couplings) to use it as an index of the degree of congestion (when the degree of congestion is high, a larger area for wiring is necessary, and therefore, the estimated area value is increased) or to store the difference between the result after the actual optimization and the estimated value as a ratio or an absolute value difference to modify the library for estimating timing/area by taking into consideration the stored ratio or absolute value difference.

Figure 16:
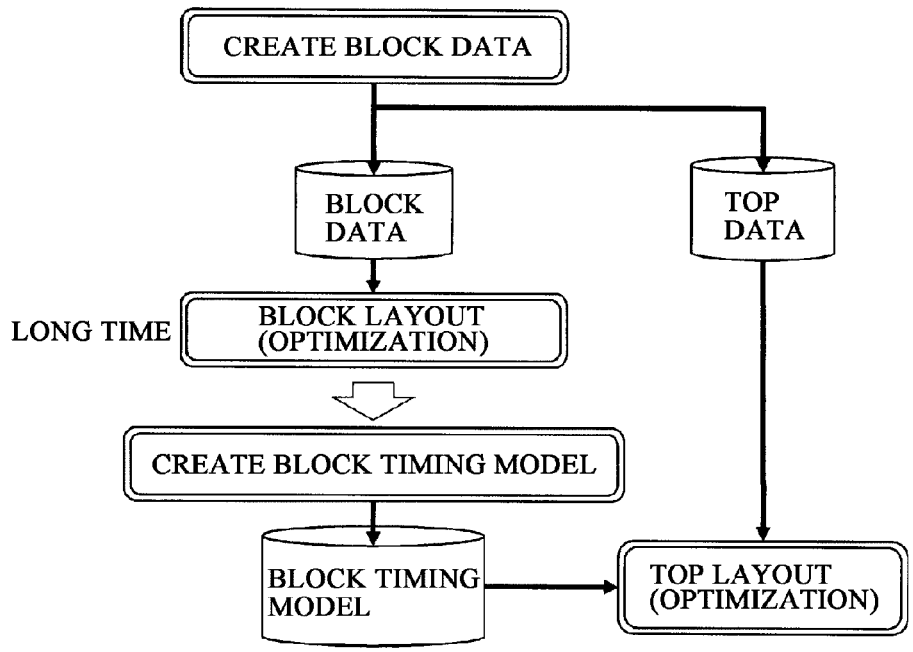
FIG. 16 is an explanatory diagram showing an example of hierarchy layout processing the inventors of the present invention have examined.

It is possible to use the present invention not only to place cells but also to reduce the design term of a hierarchy layout Normally, in the hierarchy layout processing, as shown in FIG. 16, until the block layout is completed by using the block data created, it is not possible to create the block timing model or to perform the top layout.

Figure 17:
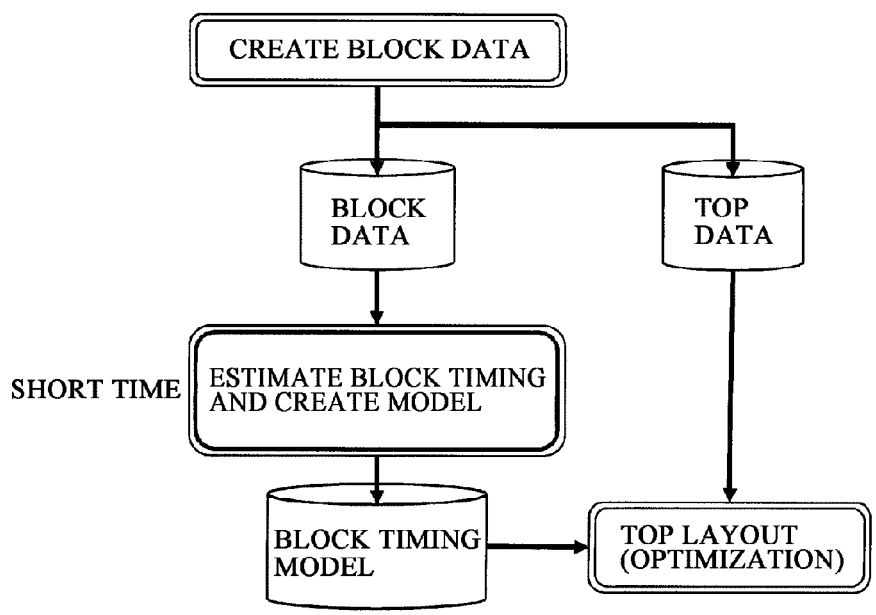
FIG. 17 is an explanatory diagram showing an example of layout processing when using the timing estimation of a block according to an embodiment of the present invention in the hierarchy layout processing.

However, as shown in FIG. 17, according to the present invention, it is possible to estimate the block timing from the block data and to create the model, and therefore, it is possible to start the top layout and optimization before the block layout is completed. At this time, it is also possible to estimate the clock delay (in this case, it is assumed that the library for estimating fan-out is used).

As to the estimation according to the present invention, it may also be possible to estimate power consumption at the time of layout by also creating the library for estimating power consumption, in addition to the timing and area. Cells are moved so that the power consumption does not increase due to the buffering for the long wires or multi fan-outs and thus the wiring possible cell layout is obtained.

In this case, the timing and area when the estimated power consumption is minimal are estimated and libraries are created as the library for estimating long wires and the library for estimating multi fan-outs, respectively, and are applied to the circuit or position for which reduction in power consumption is required.

Further, it is also possible to incorporate the estimation according to the present invention in the hold timing optimization processing.

Conventionally, when another path including part of a hold timing violation path does not have a margin in the setup timing, it is not possible to insert a delay element to eliminate the hold timing violation.

Figure 18:
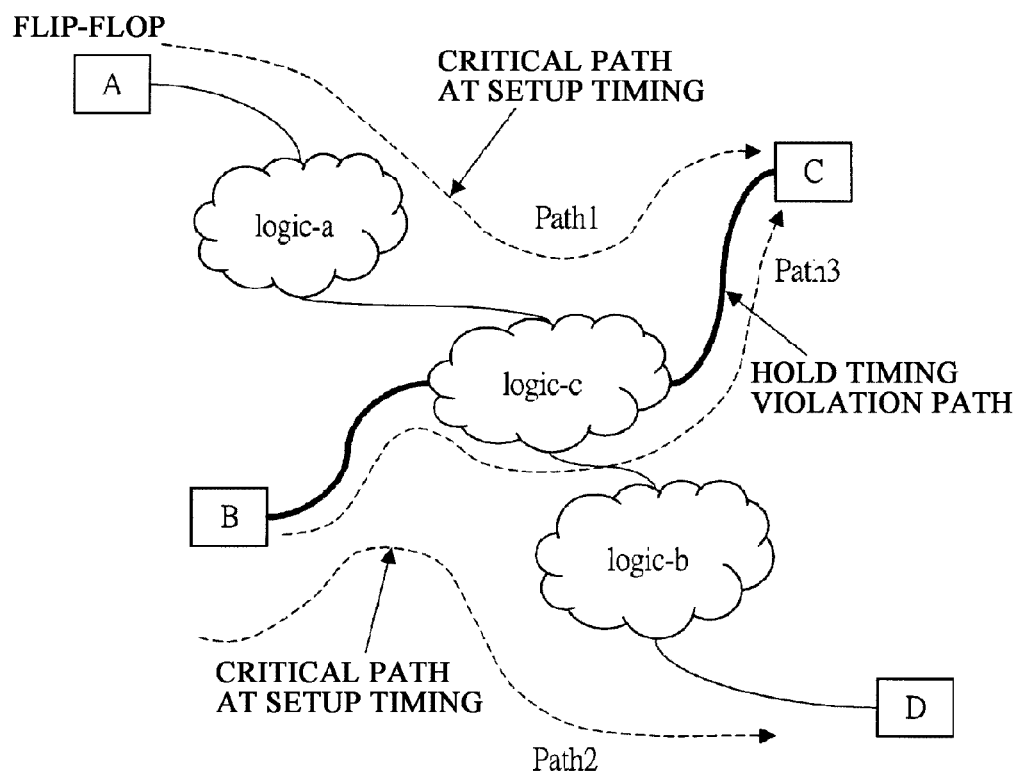
FIG. 18 is an explanatory diagram showing an example of hold timing optimization processing the inventors of the present invention have examined.
Figure 19:
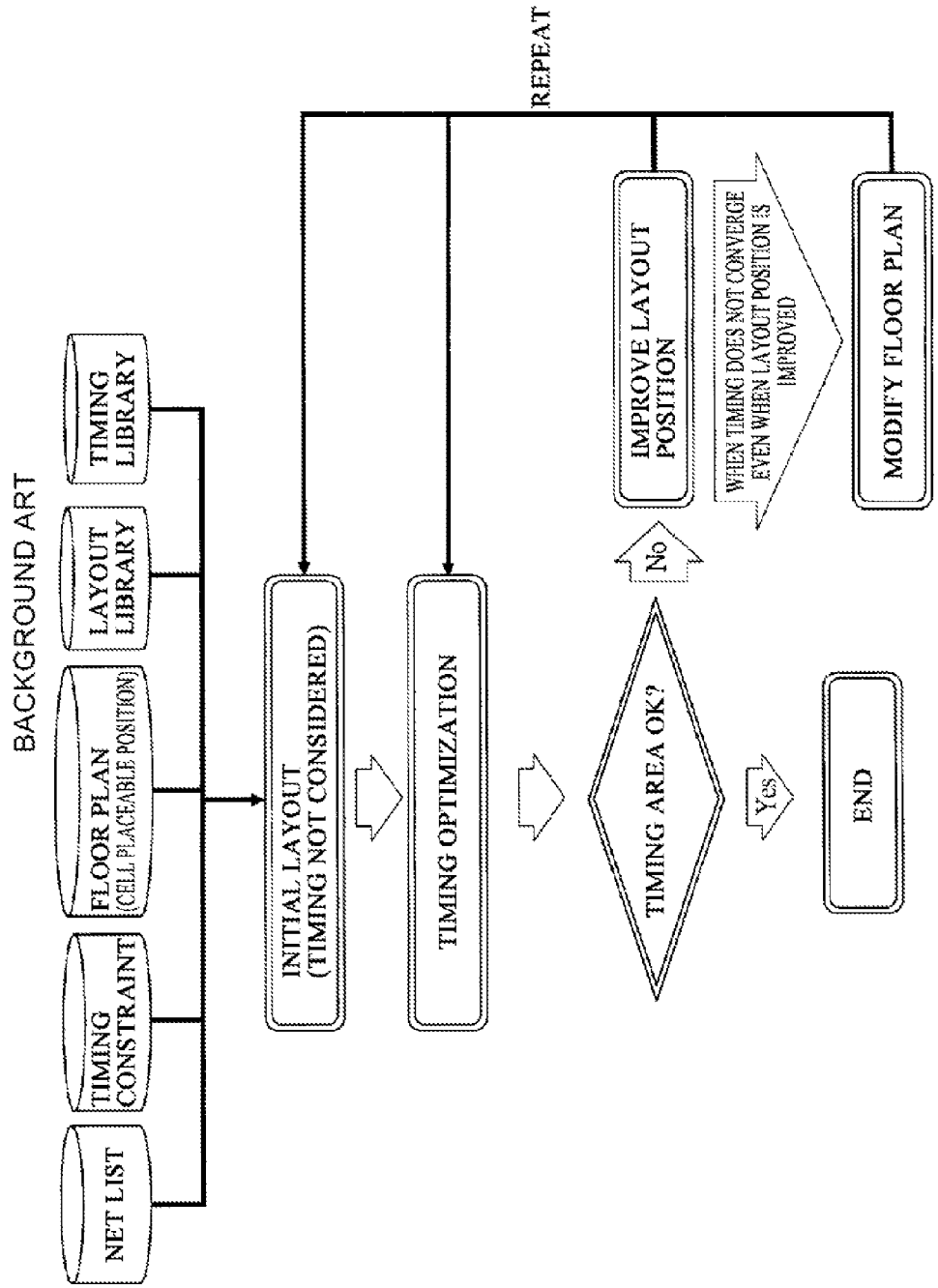
FIG. 19 is an explanatory diagram showing an example of cell layout processing the inventors of the present invention have examined.
Figure 20:
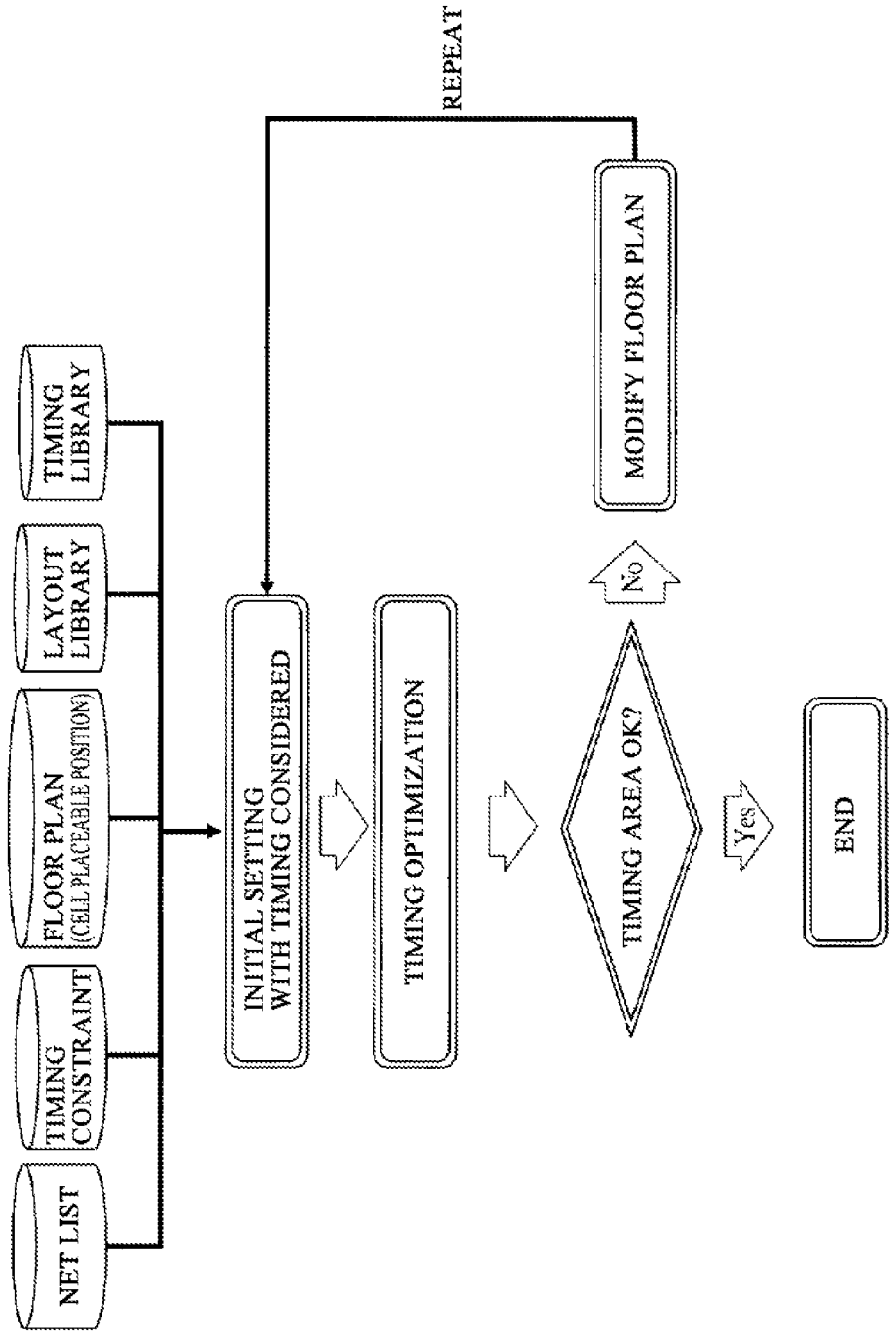
FIG. 20 is an explanatory diagram showing another example of the cell layout processing the inventors of the present invention have examined.
Figure 21:
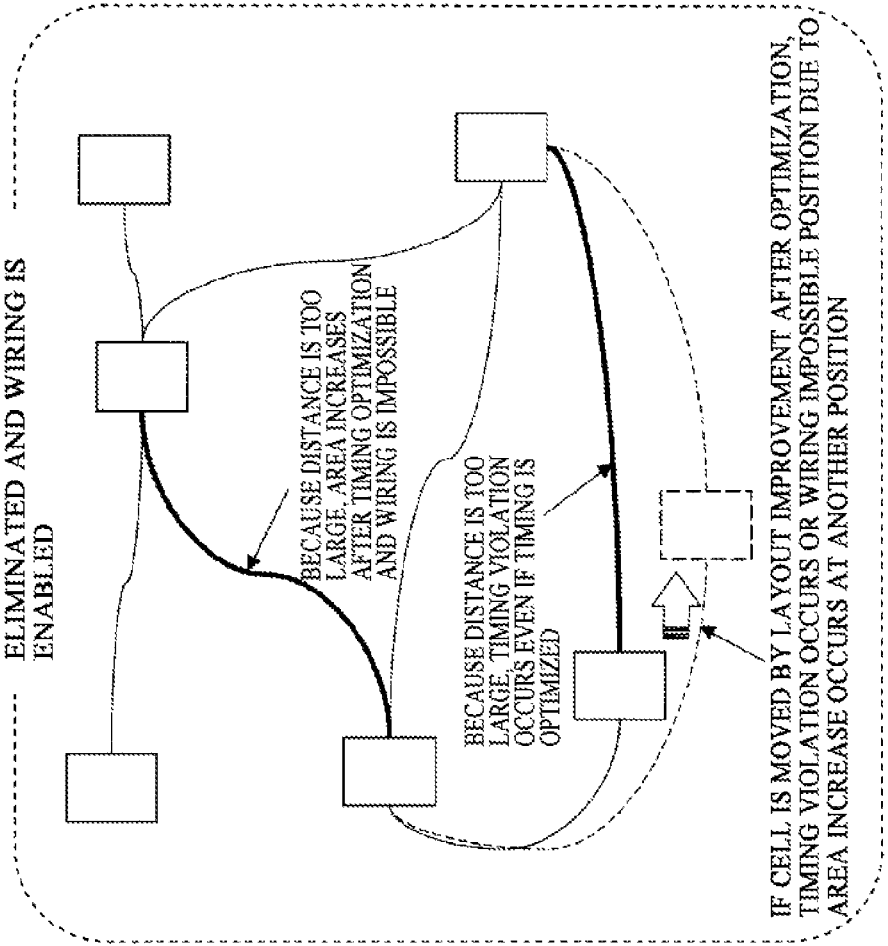
FIG. 21 is an explanatory diagram showing problems in the cell layout processing in FIG. 19.

For example, as shown in FIG. 18, when the setup timing of a path Path1 that is a coupling path of a flip-flop A, logic-a, logic-c, and a flip-flop C and a path Path2 that is a coupling path of a flip-flop B, logic-c, and a flip-flop D is severe, there is a case where the hold timing violation path of a path Path3 that is a coupling path of the flip-flop B, logic-c, and the flip-flop C cannot be eliminated or a case where the setup timing of the path Path1 or the path Path2 is allowed to eliminate the hold timing violation of the path Path3, and therefore, the setup timing violation of the path Path1 or the path Path2 is left.

However, by incorporating the estimation of the area and delay according to the present invention in the hold timing optimization processing, it is possible, even when the setup timing does not have a margin, to estimate timing after optimization, to extract a part having a margin in timing after optimization, and to insert a delay element to eliminate the hold timing violation.

In this case, the setup timing after the optimization of logic-a and logic-b in FIG. 18 is estimated by the proposed method, a difference (degree of margin) between the actual timing and the estimated timing is found, a delay cell (buffer) is inserted into the flip-flop B→logic c-c in the allowable range of the degree of margin of the logic logic-a and into the logic logic-c→the flip-flop C in the allowable range of the degree of margin of the logic logic-b, and thus the hold timing violation of the path Path3 is eliminated.

After the hold timing violation is eliminated, the setup timing violation of the path Path1 and the path Path2 is left, however, it is possible to eliminate the setup timing by optimizing the logic logic-a and the logic logic-b in the direction toward high speed while holding the path Path3.

Because of the above, according to the present embodiment, the cell layout is determined by estimating the timing and area after timing optimization, and therefore, the processing, such as the cell layout improvement and the floor plan change, after timing optimization is no longer necessary, and therefore, the design term can be reduced.

Further the estimation of the timing and area is prepared as a library, and therefore, the optimization processing is not necessary on the way of layout and it is possible to obtain an estimated value at high speed.

Furthermore, during the cell layout processing, it is not necessary to update the database because the timing optimization (circuit change) is not performed actually, therefore, it is possible to perform processing at high speed and to reduce the overhead of memory consumption.

The invention made by the inventors of the present invention is specifically explained as above based on the embodiments, however, the present invention is not limited to the embodiments and it is needless to say that there can be various modified examples within the scope not deviating from its gist.

The present invention is suitable for automated layout design technology of a semiconductor integrated circuit device.

What is claimed is:

1. A design method for automatically placing cells of a semiconductor integrated circuit device by using a computer system, comprising:

during a period of a cell layout processing by a layout program on the computer system, a library for estimating timing and area is used to estimate a timing constraint and an area increase after timing optimization and to place cells so that wiring congestion does not occur while meeting the timing constraint, wherein the library for estimating timing and area includes a library for estimating long wires, a library for estimating multi fan-outs, and a library for estimating multi-stage logic, resulting in a path, the timing of which before layout is different, wherein the library for estimating long wires includes a library of estimated delay values and estimated cell areas in accordance with distances by the cell drive capability change or buffering by changing a cell wiring distance, wherein the library of estimated delay values and estimated cell areas includes delay values and cell areas estimated on an assumption that a point where an inverse of speed is minimal for the wiring distance is buffered, and wherein the point where the inverse of speed is minimal for the wiring distance is found for each of two or more different buffer drive capabilities and the library for estimating long wires estimates the delay value and the area, respectively, based on the point where the inverse of speed found for each of the two or more different buffer drive capabilities is minimal.

2. A design method for automatically placing cells of a semiconductor integrated circuit device by using a computer system, comprising:

during a period of a cell layout processing by a layout program on the computer system, a library for estimating timing and area is used to estimate a timing constraint and an area increase after timing optimization and to place cells so that wiring congestion does not occur while meeting the timing constraint, wherein the library for estimating timing and area includes a library for estimating long wires, a library for estimating multi fan-outs, and a library for estimating multi-stage logic, resulting in a path, the timing of which before layout is different, wherein the library for estimating multi fan-outs includes a library of delay values estimated from the number of stages of a buffer tree and areas estimated from a buffer number by changing the fan-out number and estimating the number of stages of the buffer tree and the buffer number required for division, wherein the library of estimated delay values and estimated areas includes delay values and areas estimated on an assumption that a point where an inverse of speed for a wiring distance is minimal is buffered, and wherein the point where the inverse of speed is minimal for the wiring distance is found for each of two or more different buffer drive capabilities and the library for estimating multi fan-outs estimates the delay value and the area, respectively, based on the point where the inverse of speed found for each of the two or more different buffer drive capabilities is minimal.

* * * * *